C. R. CARPENTER.
GRINDING MACHINE.
APPLICATION FILED DEC. 14, 1909.

1,022,224.

Patented Apr. 2, 1912.
8 SHEETS—SHEET 1.

Fig. 1.

Witnesses
W. A. Williams
E. R. Peck

Inventor
Charles R. Carpenter
By Hubert E. Peck
Attorney.

C. R. CARPENTER.
GRINDING MACHINE.
APPLICATION FILED DEC. 14, 1909.

1,022,224.

Patented Apr. 2, 1912.

Witnesses
W. A. Williams
E. R. Peek

Inventor
Charles R. Carpenter
By Hubert Peek
Attorney

C. R. CARPENTER.
GRINDING MACHINE.
APPLICATION FILED DEC. 14, 1909.

1,022,224.

Patented Apr. 2, 1912.
8 SHEETS—SHEET 5.

Witnesses
W. A. Williams
E. R. Peck

Inventor
By Charles R. Carpenter
Hubert E. Peck
Attorney

C. R. CARPENTER.
GRINDING MACHINE.
APPLICATION FILED DEC. 14, 1909.

1,022,224.

Patented Apr. 2, 1912.

UNITED STATES PATENT OFFICE.

CHARLES R. CARPENTER, OF RACINE, WISCONSIN.

GRINDING-MACHINE.

1,022,224.  Specification of Letters Patent.  Patented Apr. 2, 1912.

Application filed December 14, 1909. Serial No. 533,001.

*To all whom it may concern:*

Be it known that I, CHARLES R. CARPENTER, a citizen of the United States, residing at Racine, Racine county, Wisconsin, have invented certain new and useful Improvements in Grinding-Machines; and I do hereby declare the following to be a full, clear, and exact description of the invention, such as will enable others skilled in the art to which it appertains to make and use the same.

This invention relates to certain improvements in grinding machines; and the objects and nature of my invention will be readily understood by those skilled in the art in the light of the following explanations of the accompanying drawings illustrating what I now consider my preferred embodiment from among other formations, arrangements and combinations within the spirit and scope of my invention.

The invention consists in certain novel features in construction and in combinations and arrangements of parts as more fully and particularly set forth hereinafter.

Referring to the accompanying drawings: Fig. 3, is an elevation showing the right hand table in the position shown by Fig. 1. Fig. 3ª, is a detail perspective view of the table carriage and the lever feed works, the table being removed.

In the specific example illustrated, 1, is an upright base, frame or pedestal at its upper front portion provided with a pair of horizontal alined and spaced journal boxes 2, in which the horizontal rotary shaft or arbor 3, is mounted. 4 is a driving pulley arranged on said shaft between the boxes 2. The opposite projecting ends of the arbor 3, are provided with the grinding disks 5 arranged beyond the side faces of the base 1 and suitably fixed on the ends of the arbor. These disks or grinding heads 5 are provided with any suitable vertical grinding surfaces at their flat outer faces. For instance, said heads 5, can be formed by flat circular metal disks on the vertical outer faces of which renewable sheets or disks of abrading material are secured, although I do not wish to so limit my invention. In the example illustrated, I show a pair of grinding disks or heads, that is right and left hand disks, but I do not so wish to limit my invention for if so desired, but one grinding disk or head can be employed as will be understood by those skilled in the art.

Work tables or supports are provided for the grinding heads and these tables are arranged at the outer vertical grinding faces of said heads, and means are provided whereby each table is vertically adjustable, and whereby each table can be fed toward and from the grinding face, and whereby the table can be tilted to the desired angle from the horizontal. I show two work tables 6, one for the right hand grinding disk and the other for the left hand grinding disk. Each table is provided with its independent supporting and controlling devices, and I do not wish to limit my invention to the employment of the two independent tables, inasmuch as the machine even though having two grinding disks or heads, might be provided with but one work table. In the example illustrated, I show a flat top approximately rectangular work table 6, at the central portion of its under part having a pair of depending spaced lugs or ears 7 between which is received the vertical upwardly extending ear 8 of a table feed carriage 9. The table is secured to said carriage by means of a transverse clamping and pivot bolt 10 passing through the lugs 7 and ears 8, and at one end provided with a nut and at the opposite end provided with a depending handle 11, whereby the bolt can be rotated in the lugs and ear to loosen the table so that the same can be oscillated on the bolt as a center and whereby the bolt can be tightened to lock the table in the desired adjustment. In the example illustrated, the bolt is arranged in a vertical plane parallel with the plane of the grinding surface so that when the table is tilted on the bolt as a center the inner straight edge of the table adjacent to the grinding surface, will move vertically. The angle of inclination of the top surface of the table with respect to the plane of the grinding surface is determined by a depending finger or pointer 12, at its lower free edge portion having a suitable index mark or the like. At its upper end this pointer is formed with a hub arranged between the ear 8 and one of the lugs 7 and loosely receiving the pivot and clamping bolt 10.

The pointer is held to rock with the table 6 and on the bolt 10 by means of horizontal oppositely projecting arms 14 from the quadrant hub and immediately beneath the table, in connection with set screws 15 carried by and vertically adjustable through said arms 14 into engagement with the under side of the table. The pointer depends at a side face of the feed carriage 9, and the feed carriage is cast or otherwise provided with a raised or laterally projecting segment 16, at its inner or concaved edge traversed by the free end of the pointer and formed with a graduated scale indicating various angles which can be assumed by the table. The index on the free end of the pointer is adapted to register with any one of the graduations and show the angle of the table. Certain advantages are attained by employing this pointer and fixed scale arrangement, over the common form wherein a quadrant swings with the table, inasmuch as in my improvement the operator need only observe the graduation on the fixed scale indicating the desired angle and then tilt the table until the pointer index coincides with such graduation, and furthermore my said improved construction will reduce the cost of production over the common quadrant arrangement.

If so desired, the work table, intermediate its length and width, can be provided with vertical holes 17, extending therethrough to receive bolts or other means for clamping fixtures or the like, in the desired position on the table. I also provide an improved table protractor whereby the horizontal angle of the work with respect to the grinding surface can be determined. The vertical angle of the work with respect to the grinding surface is determined by the angle of inclination of the table attained by oscillating the table on the pivot and clamping bolt 10 or other equivalent means.

Figure 13:
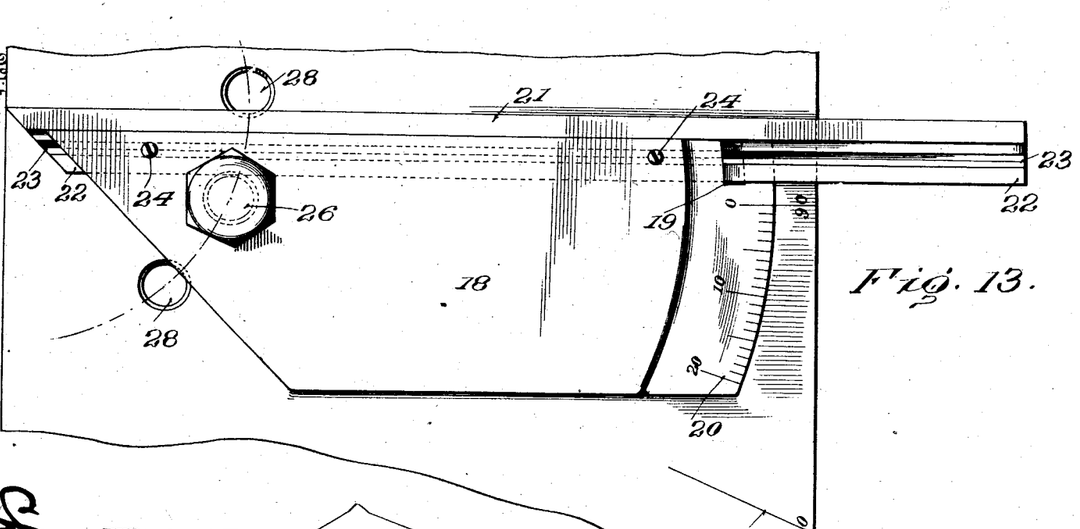
Fig. 13, is a top plan of the protractor and part of the work table.
Figure 14:
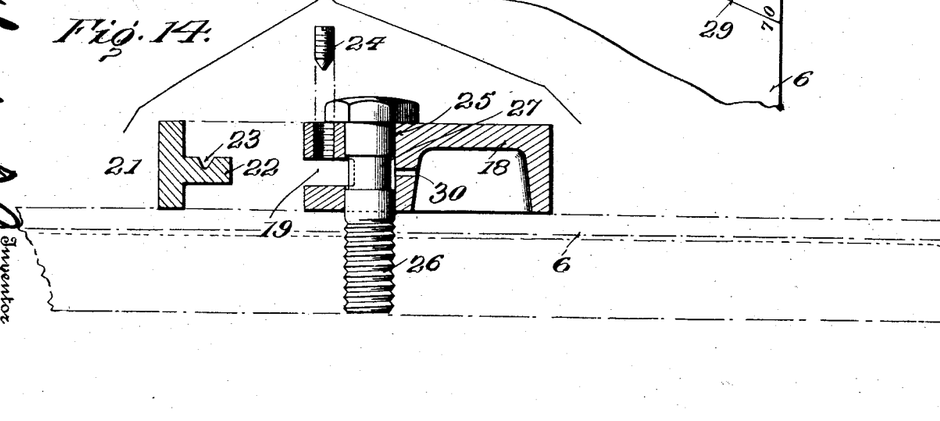
Fig. 14, is a cross section of the protractor, parts thereof being shown separated.

The protractor comprises a flat head body or block 18, resting horizontally on and adjustable over the top face of the table and removably secured thereto. This block is in length preferably less than the width of the table, and is straight throughout the length of one longitudinal edge and throughout the length of said straight edge is formed with a groove or slideway 19 opening through the vertical edge face of the block about intermediate the thickness of the block. The inner transverse edge or end of the block can be beveled off to form an acute angle at its juncture with said straight longitudinal edge, and the outer or rear end of the block is preferably curved to form a segment of a circle and is beveled off and provided with a scale or graduations 20. 21, is an elongated straight protractor blade formed to fit said straight longitudinal edge of the protractor and lie thereagainst and parallel therewith and to be movable or adjustable longitudinally thereof. To this end, the rear vertical face of the blade is throughout its length formed with longitudinal projecting flange 22, formed to fit longitudinally within the block groove 19, and to slide longitudinally therein and thereof, when released from means clamping the blade to the block. Means are provided to maintain the blade parallel with the block edge and to hold the blade to the block edge. For instance, the flange can be formed with a V-shaped groove 23, in its top face and extending throughout the length thereof, to receive the conical ends of set screws 24, adjustable in the block 18 and accessible at the top surface of the block. These screws can be easily adjusted to maintain the desired position of the blade and to tighten or loosen the same. At its inner end the blade can be transversely beveled to coincide with the bevel of the inner end of the protractor block.

Suitable means are provided for removably coupling the protractor to the table and whereby the protractor can be clamped in the desired adjustment. For instance, I show the protractor block formed with transverse bolt hole 25, arranged intermediate the ends of the block and adjacent the straight longitudinal edge thereof and intersecting the groove or slideway 19. This hole 25, receives the protractor-clamping-and-pivot bolt 26 adapted to pass freely and vertically therethrough and having a head to clamp down on the top surface of the block and a downwardly projecting threaded lower end to screw into the table and thereby clamp the block down on the table. At an intermediate portion in its length the bolt is reduced in diameter to provide reduced portion 27, in the horizontal plane of the protractor blade groove 19, where the bolt hole intersects the groove 19. This reduced portion 27, is in length preferably greater than the width of the groove 19, and the flange 22 of the protractor blade projects thereinto and prevents withdrawal of the bolt from the block unless the blade has been moved longitudinally a distance to clear said bolt. The bolt is thereby loosely confined to the block when the block is removed from the table, yet the bolt can be screwed into or from the table to secure or permit removal of the block without removing the blade. The reduced portion of the bolt is of such length as to permit vertical movement of the bolt to lock the block to the table and to sufficiently loosen the block to permit horizontal swing thereof on the bolt as a pivot, even while the blade is in normal position. If so desired, the protractor block can be horizontally slotted at 30, inwardly through the inner wall of the groove 19, and adjacent to the bolt hole 25, so that when the block clamping bolt is tightened the opposite walls of the groove will be pressed against the blade flange to tightly grip and lock the same. However, I do not wish to so limit all features of my invention.

I provide the table with a series of threaded vertical sockets or holes 28, to removably and individually receive the protractor clamping and pivot bolt 26. These sockets 28 are preferably uniformly spaced apart and are all arranged the same distance from a point at the front edge of the table, say about at the center of the length of said edge of the table, so that the series of sockets is arranged in a curved line or arc of a circle. The protractor clamping bolt is adapted to enter any one of these sockets and to secure the protractor with its blade point at or about at said central point along the front edge of the table. The protractor can be arranged at various angles with respect to the front edge of the table by adjusting the protractor clamping bolt to different sockets 28, and the different angles can be indicated by graduations or scale marks 29, on the top face of the table, beyond the rear end of the protractor block and adapted to register with the indications of the scale 20 thereof. The bolt hole 25 of the block forms the center of the arc of the curved scale 20 or rear end of the block and the block is pivotally adjustable on the clamping bolt as a center to vary the angle of the blade when the bolt is in any one of the sockets 28.

My protractor can be used on a work table or support having a straight rear or back edge which is of advantage, in certain instances, inasmuch as the operator is thereby enabled to square up his work or fixtures from such edge. By employing a protractor embodying a blade adjustable to and from the grinding disk, I am enabled by such adjustment to maintain the front edge or point of the blade close to the face of the disk to form a work rest or guide whatever may be the angular adjustment or position of the protractor about its pivot-and-clamping bolt as a center or about any one of the table sockets 28, for said bolt, as a center, as will be readily understood by those skilled in the art.

The table and its carriage are mounted on and carried by a counterbalanced swingable frame or rocker arm fulcrumed a distance below the table on a horizontal fulcrum, the horizontal axial line of which is at right angles to the vertical plane of the grinding surface so that oscillation of said rocker arm carries the table across the face of the grinding surface in a vertical plane parallel therewith.

The arm-supporting fulcrum is vertically adjustable to raise and lower the rocker arm and table; said fulcrum being preferably bodily movable or adjustable in a curved line about a fixed center while maintaining its horizontal position. The rocker arm 31 is vertically arranged and at its upper end is formed with a horizontal elongated table-carriage-receiving stud 32, usually cylindrical in cross section and projecting therefrom toward the grinding surface. At its lower end, said rocker arm is formed with a horizontal hub or journal box 33, parallel with said stud 32, and arranged below the same. This hub receives and is mounted to turn or oscillate on the horizontal stud 34, parallel with the table-carriage stud 32, and constituting the rocker arm fulcrum and support. If so desired, the bearing hub 33, can be longitudinally split on one side and held adjustably closed by screws 35, liners being employed if so desired, so that wear can be taken up and the desired fit of the hub on the stud can be maintained.

Any suitable device can be provided for maintaining the hub on the fulcrum stud 34, and against longitudinal movement therefrom. For instance, I show a split collar or ring 36, removably clamped on the reduced end of the stud 34, projecting outwardly beyond the end of the hub.

The rocker arm is preferably counterbalanced to constantly tend to maintain its normal vertical position. For instance, I show a rigid straight bar 37, depending from the rocker arm hub and at its upper end fixed thereto and suitably longitudinally threaded at its lower end to enter and screw into the threaded bore of counterweight 38, carried by and adjustable longitudinally of said bar.

Figures 7, 8, 9, 10:
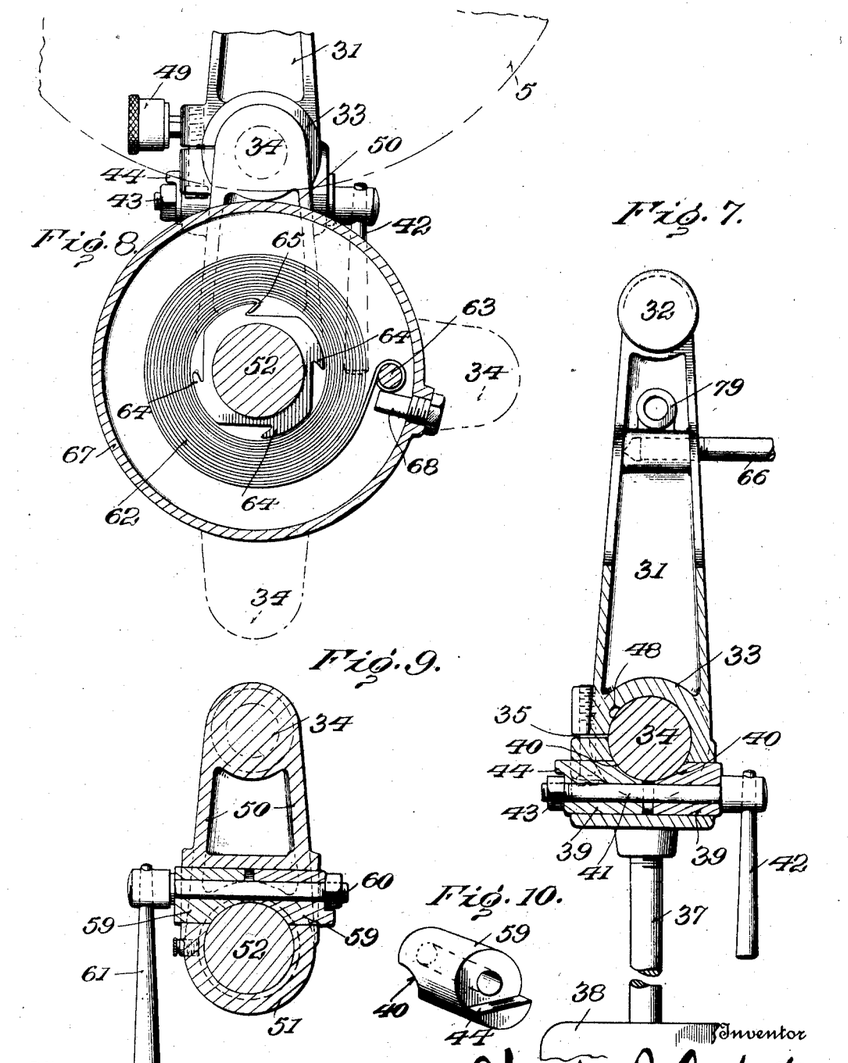
Fig. 7, is a vertical detail sectional elevation on the line 7—7, Fig. 4.
Fig. 8, is a vertical section on the line 8—8, Fig. 4.
Fig. 9, is a vertical section on the line 9—9, Fig. 4.
Fig. 10, is a detail perspective view of one of the clamping blocks of Fig. 9.
Figure 11:
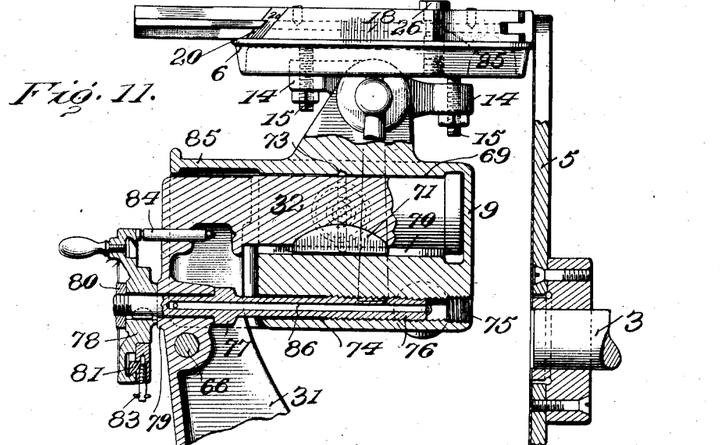
Fig. 11, is a vertical section showing the feed works of the left hand table of Fig. 1.
Figure 12:
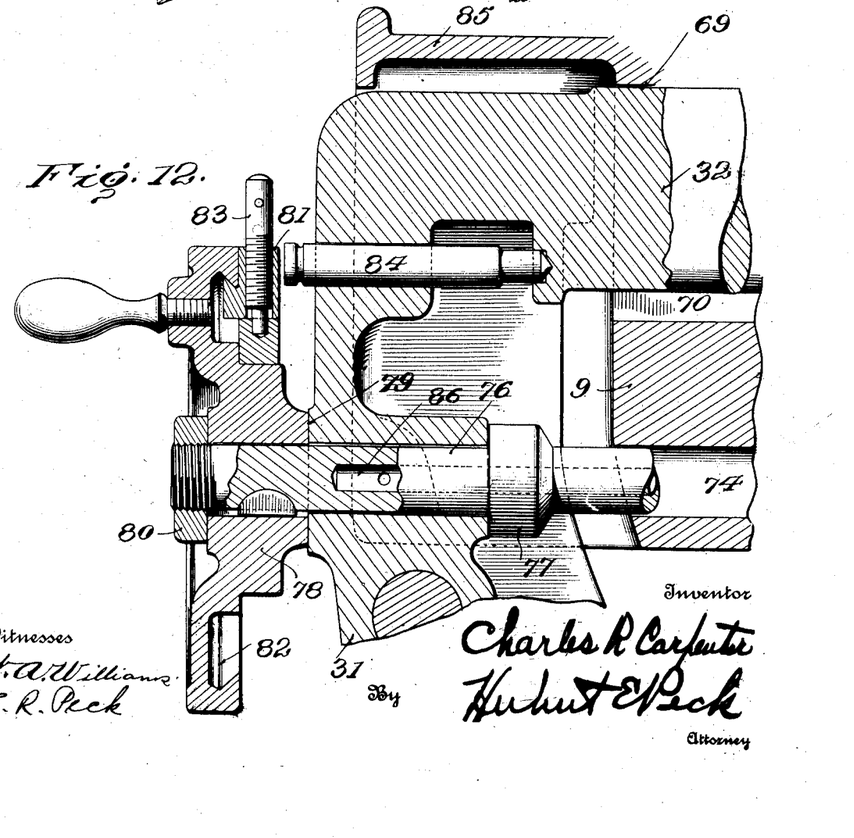
Fig. 12, is an enlarged sectional view thereof.

Suitable means are provided for locking the table-carrying rock arm to and against oscillation on the supporting fulcrum 34. For instance, as means which can be provided for this purpose, I show a pair of slidable opposing clamping or locking blocks 39, arranged within and transversely of the lower portion of the hub below said fulcrum stud 34, and at their inner upper corners concaved, beveled or recessed at 40, to fit opposite portions, respectively, of the under surface of the stud. The two slidable clamping blocks have alined bolt holes extending longitudinally therethrough, to receive the clamping bolt 41, at one end having an exterior depending handle 42, and an exterior head abutting against the outer end of one block, and an exposed nut 43, at its opposite and threaded end and abutting against the outer end of the other block, whereby by rotating said bolt in one direction through the medium of said handle, the blocks can be forced toward each other and against the stud to rigidly clamp the hub and stud together, or by rotating the bolt in the opposite direction the pressure on the blocks will be relieved to permit free turning of the stud within the hub or of the hub on the stud. The hub is formed with a transverse passage extending through its lower portion and opening into the bore of the hub to receive said clamping blocks and form a housing and slideway therefor and said passage is arranged about at the center of the length of the hub. By this arrangement, when the blocks are drawn toward each other to clamp the fulcrum stud the hub is drawn down tightly and squarely on the longitudinal top portion of the stud without tending to tip the rocker arm from its proper vertical position with respect to the face of the grinding surface, thereby preventing the table or work holder from being thrown or shifted from proper position with respect to the grinding surface, by the act of applying or releasing the clamp.

The clamp embodying the lateral handle can be most quickly and readily applied and released without requiring a separate wrench, to lock the rocker and work holder or table in the desired position or to release the same for oscillation on the fulcrum stud.

If so desired, one of the clamping blocks 39, can at its outer end be provided with a transverse straight shoulder 44, spaced a distance from the bolt hole through the block to form a stop or bearing abutment for the nut 43, to prevent rotation of the nut, and yet to permit turning of the nut on the bolt when the bolt has been unthreaded from the nut such a distance that the bolt can be pushed through the blocks to carry the nut outwardly clear of the shoulder for the purpose of adjusting the nut to bring the handle 42, in any desired position.

If so desired, a dust proof inner thrust bearing can be provided between the rocker arm hub and its supporting fulcrum stud or shaft. For instance, I show the fulcrum stud reduced at its outer end from a point within the outer end portion of the hub to form the annular outwardly facing bearing or thrust shoulder 45, while the hub is internally and annularly enlarged in the transverse plane of said shoulder forming an annular oil groove 47, around the same and is internally reduced outwardly beyond said shoulder to form the annular bearing surface 46, opposing and running in engagement with said shoulder 45.

If so desired the hub can be formed with an internal longitudinal side oil receiving and distributing groove 48, opening at one end into said annular groove 47, and communicating through a radial duct with an external compression oil or grease cup 49, fixed to and projecting horizontally from the hub for supplying lubricant to the interior of the hub.

Mechanism is provided for supporting and raising and lowering the rocker arm and table carrying fulcrum stud 34, and preferably whereby the same is supported from and swingable about a certain center through the medium of a radial arm or the like. For instance, I show said stud carried by and projecting outwardly from the otherwise free end of a radial or crank arm 50, usually formed in one piece with said stud and projecting radially from the outer end portion of and usually formed in one piece or otherwise rigid with a crank hub or sleeve 51, mounted longitudinally and turnable on a fixed horizontal shaft 52, parallel with and arranged below the arbor 3, and also parallel with the fulcrum stud 34, and the carriage supporting stud 32.

The fixed shaft 52, in the specific example illustrated, extends transversely across the front portion of the base a distance below the rotary arbor 3, and is secured and fixed to the base by boxes or clamps 53, with its opposite ends projecting beyond the frame sides to carry the crank sleeves or hubs 51, of the work tables or supports at the opposite sides of the machine, where two sets of work tables and supporting devices are employed, although I do not so wish to limit my invention. The crank hub can rotate or oscillate on its shaft 52, to swing its radial arm vertically and thereby carry its fulcrum stud 34, up and down to vary the vertical position of the rocker arm and work table carried thereby. The crank hub is suitably confined on the shaft, as by removable collar 54, and the end portion of the shaft can be reduced to form the annular thrust bearing surface 55, within the crank hub, and opposed and engaged by annular internal reduced portion 56, of the hub, and surrounded by internal annular oil groove 57, all as described in connection with the internal dust proof thrust bearing between the rocker arm hub and its fulcrum stud. The crank hub can also be provided with a longitudinal internal oil retaining and distributing groove and an external oil cup, the same as described in connection with the rocker arm hub, although I do not wish to so limit my invention. I also provide means whereby the crank hub can be quickly and easily locked against or released for rotation on its shaft. For instance, the crank hub can be provided with a locking or clamping device of the same construction as described, in connection with the rocker arm hub, and comprising beveled or recessed end slidable clamping blocks 59, transversely housed in the upper part of the crank hub to act oppositely on the upper part of the shaft and controlled by bolt 60, at one end having a nut and at the opposite end having depending crank handle 61. By this arrangement a very powerful clamp is provided which can be almost instantaneously applied or released, and by which the work table can be rigidly locked and held at any desired elevation attainable through the arc in which the fulcrum stud swings from shaft 52, as a center.

I preferably provide means for counterbalancing the crank arm and the load (fulcrum stud, rocker arm and work table) carried thereby. For instance, I provide a balancing spring acting on the crank hub for this purpose. I show a heavy coiled spring 62, surrounding the inner end of the crank hub and at its outer or fixed end having an eye receiving pin 63, suitably fixed with respect to the crank hub, as by being secured to an adjacent part of the base or portion secured to the base. The inner or movable end of the spring is secured to the crank hub for propelling said hub. I usually adjustably secure the inner end of the spring to the hub so that the power of the spring on the hub can be increased or diminished. For instance, I show the hub formed with an annular series of teeth or notches 64, and the movable end of the spring provided with hook 65, capable of being sprung successively into engagement with said hooks to increase or decrease the tension of the spring, as will be readily understood by those skilled in the art. The spring is so applied to the crank hub as to constantly exert its tension to rotate the hub in a direction to raise the crank arm, rocker arm and table, and to maintain the table at its limit of upward movement with the crank arm in a vertical position. In this normal elevated position the table, in the particular example illustrated, is not in operative position with respect to the grinding disk but is elevated approximately above the working or grinding face of the grinding disk, whereas the approximate proper operative working position of the table is attained when the crank arm is in the horizontal position in which position the spring is designed to maintain the parts even though the crank hub is not locked to its shaft by the clamp. The spring is designed to so balance the parts carried by the crank arm that the table will remain in any desired vertical position even without the application of said clamp and so that the operator can raise or lower the table by a slight pressure of the hand in the desired direction. In fact, when desiring to raise the table from a lowered position it is only necessary to give the same a slight start when it will immediately rise to its limit of upward position with the crank arm vertical.

The rocker arm is preferably provided with a laterally extending horizontal rigid rod or handle 66, at one end fixed to the upper part of the arm usually just below the work table feed carriage, and by which the rocker arm can be conveniently manipulated and held.

The crank hub is preferably formed with a casing 67, for the balancing spring consisting of a vertical disk arranged between the spring and the crank arm and an annular inwardly extending flange surrounding the spring and protecting the same against grit and dust thrown off by the grinding disk particularly in view of the fact that the lower portion of the grinding disk is arranged close to the space between the closed or disk end of said casing and the crank arm, whereby the spring casing also shields the inner end of the crank hub bearing. The outer wall or flange of the spring casing 67 is formed with a tapped hole receiving the stop pin or screw 68, projecting into the casing to engage the fixed spring-securing pin 63, when the crank hub has rotated to bring the crank arm to the vertical position with the table at its limit of upward movement, and thus prevent continued rotation of the hub in the same direction to carry the table down and up again by a complete rotation of the crank arm.

Important practical advantages are attained through the employment of a swingable radial or crank arm for raising and lowering the work table, inasmuch as I thereby avoid the necessity of employing finished and scraped flat or other sliding surfaces which are not only expensive and difficult in production but are always exposed and open to the cutting and wearing action of dirt and grit and the consequent tendency to throw the table out of proper accurate alinement.

By employing the swingable work table supporting counterbalanced rock arm mounted on and supported by a movable fulcrum, vertical adjustment of the fulcrum to raise and lower the table and rock arm does not effect the counterbalancing of the table and rock arm. In other words, the table is counterbalanced independently of the fulcrum or of the position thereof, and automatic or other devices are not required to maintain the balancing of the table as the table supports are raised or lowered.

Improved means and devices are employed whereby the work table can be adjusted toward and from the grinding face or surface and on or independently of the rocker arm. For instance, in the specific example illustrated, I show the table feed carriage 9, slidable on and longitudinally of the horizontal stud or projection 32 rigid with the upper end of the rocker arm and projecting therefrom toward the grinding surface. The feed carriage 9, is shown in the form of a horizontally elongated block or casting in its longitudinal upper portion formed with an elongated longitudinal slideway or socket 69 opening through the rear end of the carriage and formed to receive the rocker arm stud 32 in longitudinal sliding adjustment. This socket 69, is usually round in cross section to conform to the stud 32. Suitable means are provided to maintain the carriage to reciprocation on the stud in a straight line without lateral oscillation or play thereon. For instance, I show the carriage formed with a key way 70 extending longitudinally and throughout the length of socket 69 to slidably receive the key 71 fixed in the lower portion of the stud 32 and projecting therefrom intermediate the length thereof. Lubrication of the sliding surfaces of the carriage on stud 32 can be provided for by an oil cup 72 projecting laterally from the feed carriage and discharging through a radial duct into annular internal oil groove 73 surrounding the socket 69 and opening into the key way 70.

The lower longitudinal portion of the feed carriage is provided with a longitudinal internally screw threaded bore 74 open at the rear end of the carriage, and closed at the front end of the carriage. If so desired, the front end of this bore can be closed by removable screw plug 75. This longitudinally and internally screw threaded bore 74 is adapted to receive a threaded end of the carriage feed screw 76 adapted to rotate in said bore and thereby feed the carriage longitudinally of and on the stud 32.

Various constructions of feed works can be employed for moving the carriage on the stud 32. For the left hand table, of Fig. 1, I show the feed screw 76 passing outwardly through the upper end portion of the rocker arm and mounted to rotate in a bearing therein. In this formation the feed screw is provided with a fixed collar 77, engaging the inner edge or end of the rocker arm bearing for the screw to prevent outward longitudinal movement of the feed screw in the bearing while longitudinal movement of the feed screw in the opposite direction through the bearing is stopped by the engagement of the hub of the hand wheel 78, with the outer end surface 79 of said feed screw bearing in the rocker arm. The hand wheel 78 is removably keyed on the projecting outer end of the feed screw and is held thereon by removable nut 80, on the threaded outer extremity of said screw. The hand wheel 78 is provided with a circumferentially adjustable stop block 81 having a beveled projection extending into the circumferential undercut slideway 82. The adjustable stop block is provided with a clamping screw 83, whereby the same can be locked to the wheel or released to slide in way 82.

84 is a stop pin, projecting from the end of the rocker arm and adapted to engage the stop block and prevent further feeding rotation of the hand wheel when the same has moved in to a certain point in the operation of feeding the table, as will be well understood by those skilled in the art. The edge of the feed wheel is preferably provided with a scale or graduation (to thousandths of an inch if so desired) for determining the adjustment of the stop block to feed the table forward accurately the desired distance as is well understood by those skilled in the art.

The rear end of the feed carriage is formed with a rearwardly projecting flange in the form of an inverted U, forming a shield 85 closed at the top and vertical sides and open at the bottom and rear end and designed to cover and inclose the upper end of the rocker arm and the feed screw and protect the cylindrical stud 32 and the feed screw and coöperating surfaces from dust and grit, while leaving the hand or feed wheel 78 exposed and readily accessible.

For the purpose of supplying lubricant to the feed screw, and the feed screw bearing, in the rocker arm, I show the feed screw 78 formed with a central longitudinal oil duct 86 opening through the front end of the screw into the interior of the threaded bore 74, and at its rear end having a radial duct opening into the feed screw bearing in the rocker arm. The portion of the threaded bore 74 of the feed carriage between the plug 75 and the front end of the feed screw 76, forms an oil chamber which can be supplied with lubricant from an oil cup arranged at the exterior of the lower portion of the feed carriage. It will be observed that the feed screw 76, is removable from the feed carriage by removing the hand feed wheel from the outer end of the screw, and then slipping the feed carriage forwardly from the rocker arm stud, so that the feed screw can be unscrewed rearwardly from the carriage.

Figure 1:
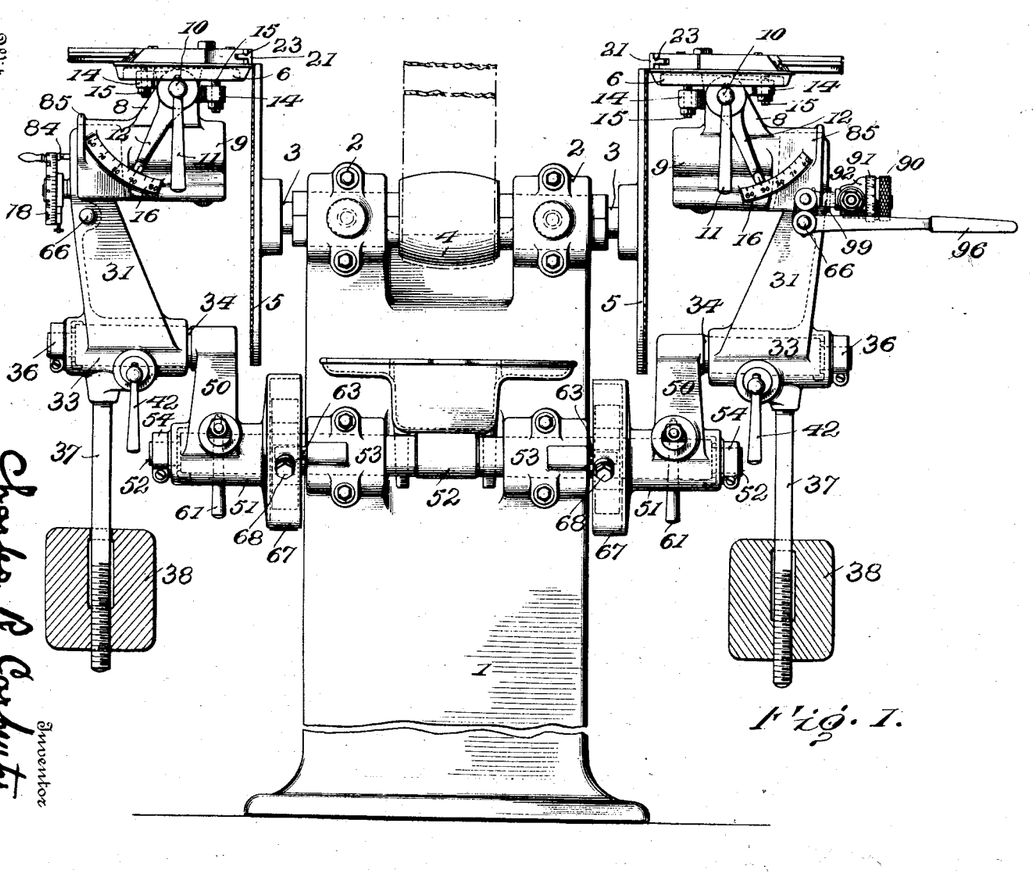
Figure 1, is a front elevation of a machine embodying my invention; my preferred form of table feed works being shown applied to the right hand table, the two tables being shown at their limits of upward movement.
Figure 2:
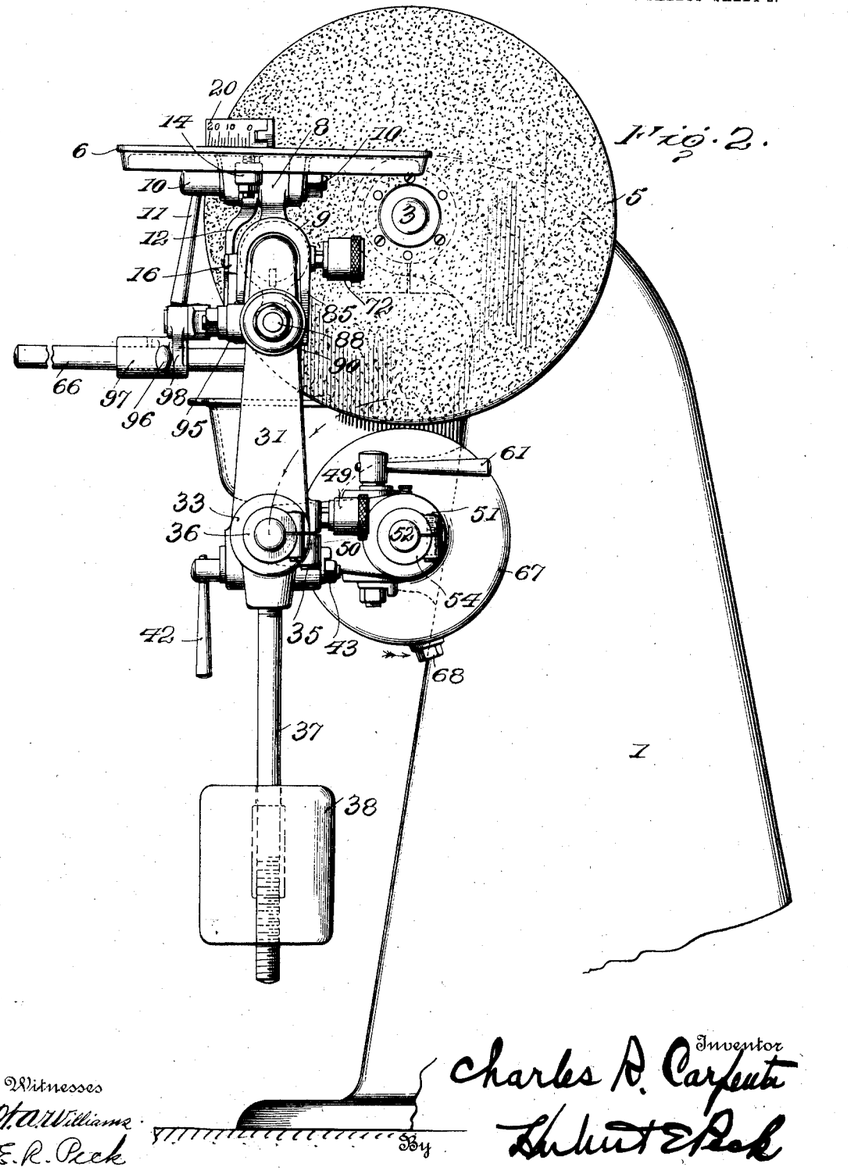
Fig. 2, is a side elevation, the table being shown in an operative position.
Figures 3, 3A:
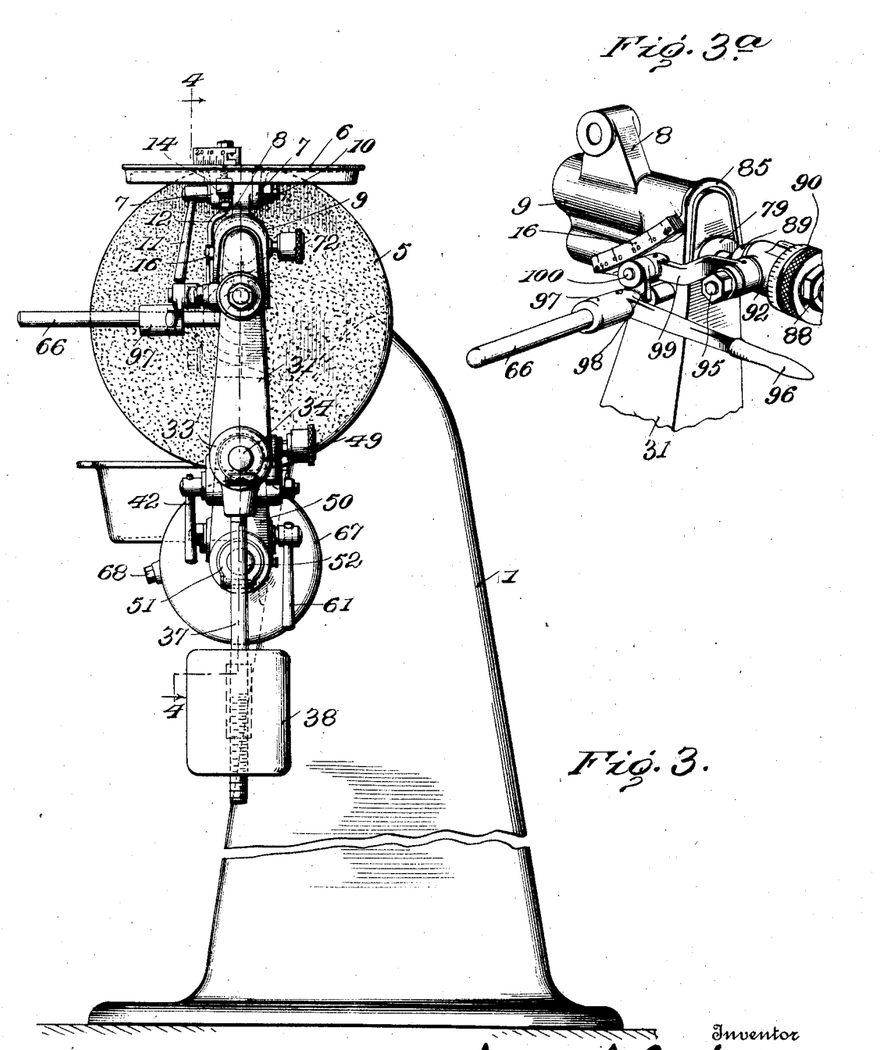
Figure 4:
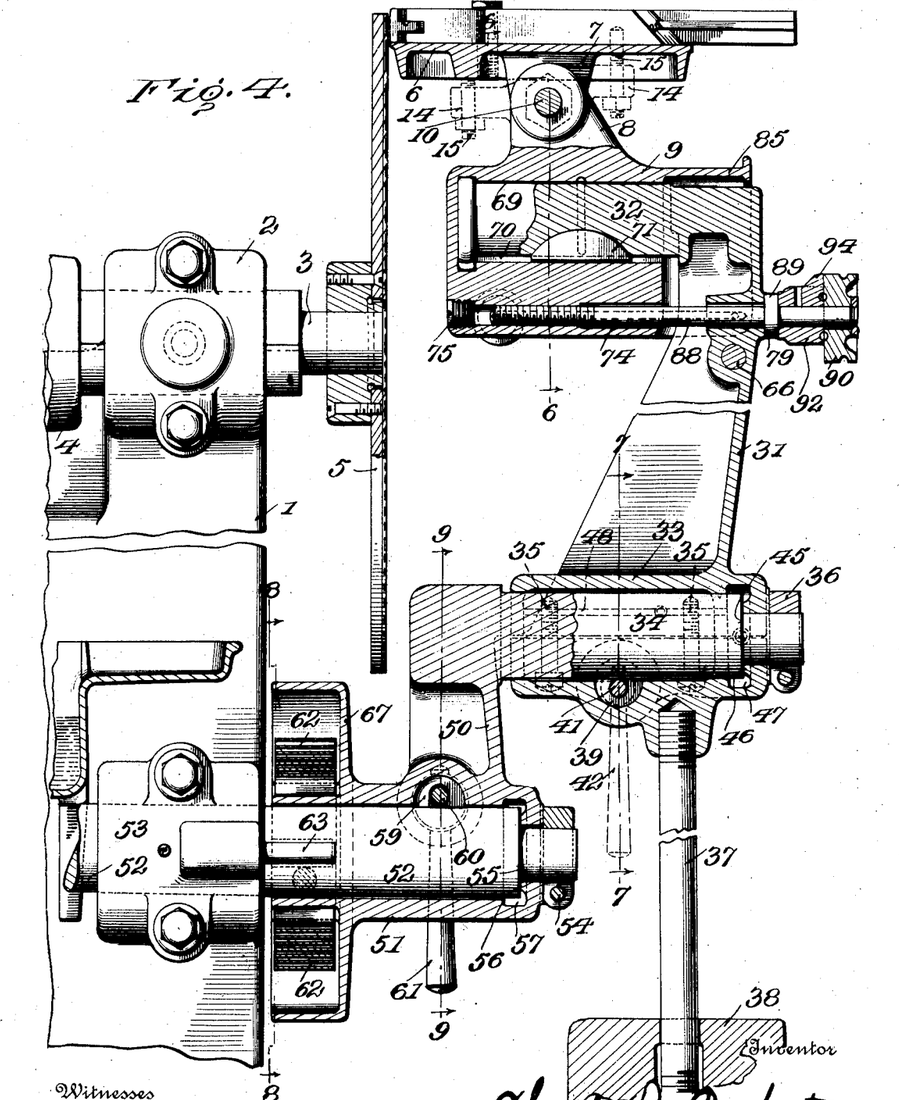
Fig. 4, is a vertical section on the line 4—4, Fig. 3.
Figure 5:
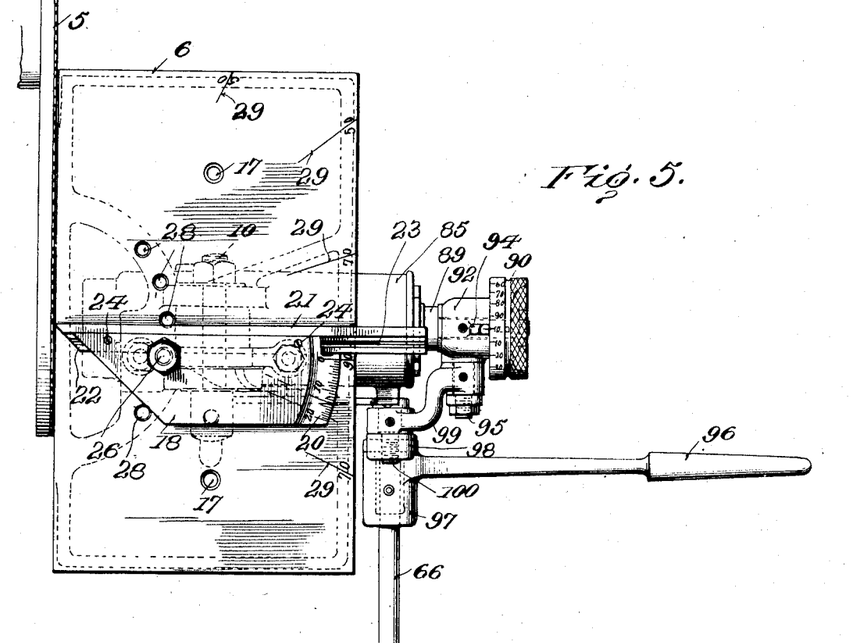
Fig. 5, is a top plan view of the structure of Fig. 3.
Figure 6:
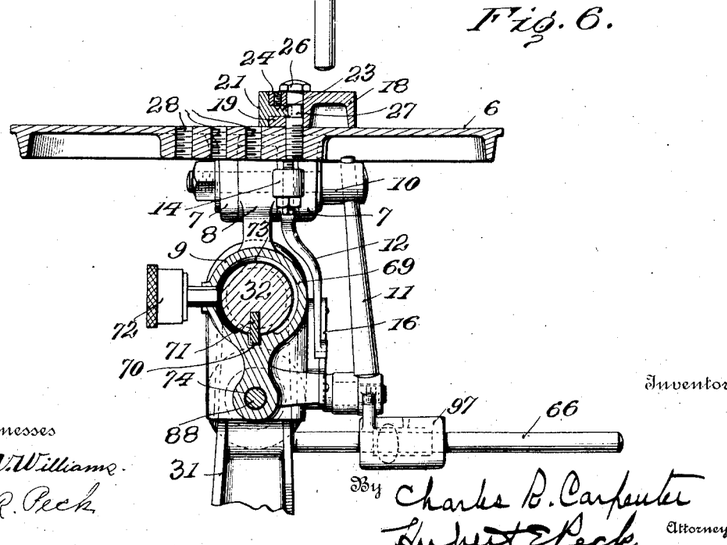
Fig. 6, is a vertical section on the line 6—6, Fig. 4.

I show the right hand feed table, Fig. 1, provided with what I term a lever feed works, removably applied thereto and capable of being substituted in place of the screw 76, with its hand feed wheel of the left hand table and hereinbefore described. This lever feed device comprises a micrometer or adjusting screw 88 screwing into the threaded bore 74 of the feed carriage and having an elongated smooth cylindrical portion projecting through and a considerable distance beyond the feed screw bearing in the rocker arm and longitudinally slidable therethrough. This adjusting screw 88 is provided with a fixed collar 89 at its outer portion in rear of the rear outer end 79 of the feed screw bearing in the rocker arm. 90, is a hand or finger knob on the rear extremity of the screw 88 and keyed or otherwise secured thereto to rotate therewith. This knob usually is formed with an exterior milled surface and with a circumferential scale 91, usually graduated to thousandths of an inch. Between the knob 90 and the thrust or fixed collar 89, is arranged a block or sleeve 92 through which the screw passes and in which it is free to rotate. This sleeve 92, is held between the knob 90 and collar 89 against longitudinal movement on the screw, and said sleeve is provided with a raised portion 94 at its top provided with an index to register with the graduations on said knob. This sleeve is formed with a laterally extending horizontal stud 95 having a screw threaded outer extremity.

A rearwardly projecting hand lever 96 with a bearing hub 97 at its front end, is removably supported by the handle rod 66, the hub 97 being slipped longitudinally onto said rod 66 to rock thereon and form the lever fulcrum. This lever hub 97, is formed with an upwardly projecting lateral arm 98 to which the front end of link 99, is pivotally joined by horizontal pin 100. The rear end of link 99, is formed with a transverse bearing opening receiving the stud 95 of the sleeve 92 and removably confined loosely thereon by one or more nuts. In applying this lever feed mechanism, the handle hub 97 is slipped longitudinally onto the rocker arm handle 66, and the loose link connection 99 can then be readily established between the lever hub and the screw sleeve 92. It will be observed that upward swing of the handle 96 will (through the medium of the link 99, and sleeve 92, bearing against fixed collar 89) move the adjusting screw longitudinally and forwardly through the rocker arm and carry the feed carriage forwardly, and that this forward sliding feeding movement of the screw rod is limited by the engagement of thrust collar 89, with the rear end 79 of the screw rod bearing in the rocker arm.

The length of the table carriage feeding stroke is varied by screwing the screw rod 88, inwardly into the carriage or outwardly therefrom to vary the rearward projection of said rod from the carriage, and consequently to vary the distance between the thrust collar 89, and surface 79, when the screw rod and feed carriage are at their limits of outward or return movements and ready to start on the feed stroke. The length of the feed stroke is determined by the graduations on the hand knob 90, in connection with the index 94, and the mechanism can be set to feed the distance desired by turning the screw rod through the medium of the hand knob until the desired graduation mark or indication registers with the index. An accurate micrometer adjustment is thus provided, and by pressing the hand lever upwardly the work table can be fed forwardly at the desired speed and pressure, and the length of the feed stroke will be most accurately gaged by the thrust collar. The carriage and table are withdrawn on the return stroke by swinging the free end of the feed lever downwardly and said lever will stop on its return stroke when it approximately reaches the horizontal position.

It is conceivable that other arrangements might be provided for adjusting the distance between a stop (such as 79) and a thrust collar on a part projecting from and sliding with the feed carriage, to set or vary the feed stroke to the desired length. Instead of attaining this adjustment by screwing the adjusting screw rod into or from the feed carriage, the thrust collar might be otherwise adjusted with respect to the feed carriage. In the present instance, I employ the adjusting screw rod having the thrust collar fixed thereon, inasmuch as such lever feed as generally described can be readily applied to machines having the feed screw and hand wheel by removing such feed screw and wheel and substituting the lever feed therefor, or the lever feed can be removed and the feed screw and hand wheel substituted. This work-support-or-table feed of the hand lever type, (Figs. 1, right hand, 2, 3, 3ª, 4, 5, 6,) which is the preferred construction of this invention, is usually employed for manufacturing purposes as where a considerable number of similar devices are to be finished, and in combination with jigs or fixtures, because the operator can so quickly by one movement of the lever, withdraw the fixture a sufficient distance from the disk to permit safe removal of the finished work and insertion of an unfinished piece, and can then quickly swing the lever and bring said work up against the disk for finishing. The hand wheel and feed screw feed shown in Figs. 1, (left hand), 11 and 12 is slower in action than the lever feed and is generally employed for tool work or where only a few similar pieces are to be finished.

It is evident that various changes might be resorted to in the forms, constructions and arrangements of the parts described, and that elements might be omitted, and features added, without departing from the spirit and scope of my invention and hence I do not wish to confine myself to the exact constructions and features illustrated.

What I claim is:—

1. In a grinding machine, in combination, a work table having an ear, a table-feed carriage having an upwardly projecting ear, a table clamping and pivot bolt passing transversely through said ears and at one end provided with a depending bolt-rotating handle, and a pointer depending beside said carriage and at its upper end having a hub centered on said bolt, and means for confining the pointer to oscillation on said bolt with the table to indicate the angle of inclination of the table, said carriage having a raised portion at the side thereof and along which the free end of said pointer moves, said raised portion having a table-angle-indicating scale.

2. A grinding machine having counterbalanced work-table supporting and controlling means comprising a supporting fulcrum provided with and carried by a counterbalanced radial arm having a hub turnable on a fixed center to raise and lower said fulcrum and the work table, said hub provided with clamping means for locking said arm in the desired adjustment.

3. A work table having supporting and controlling means comprising a supporting stud, a vertically movable radial arm carrying the same and provided with a hub, a supporting shaft on which said hub is turnable, a table-carrying rocker arm fulcrumed to said radial arm and counterbalancing means to counterbalance the weight of the table and supporting means carried by said stud.

4. A work table having supporting and controlling means comprising a vertically movable radial supporting arm provided with a hub turnable about a fixed center, a vertically-rockable table support fulcrumed to the free end of said arm, means for clamping said hub against rotation, and counterbalancing means acting on said hub to balance the load carried by said arm.

5. A work table having supporting and controlling means comprising a radial supporting arm swingable vertically about a fixed center for moving the table vertically, counterbalancing means for balancing the load supported by said arm, a table-carrying rocker arm mounted on the free end of said radial arm to swing thereon about an axis parallel with said fixed center, and means whereby said arm can be locked in any position within its range of swinging movement.

6. Vertically adjustable work table supporting and controlling means comprising a radial supporting arm swingable vertically about a fixed center to raise and lower said table, a rocker arm carried by and mounted to rock vertically on the free end of said radial arm in a plane parallel with the plane in which said radial arm in swingable and counterbalancing means acting on said arm to balance the load carried thereby.

7. Vertically adjustable work table supporting and controlling means comprising a vertically rockable frame counterbalanced to normally maintain its upright position, a radial lifting arm carrying said frame and swingable vertically about a fixed center to raise and lower said frame, said frame being pivotally mounted on the free end of said arm, and counterbalancing means acting on said arm to swing the same upwardly and balance the load carried thereby.

8. Work table supporting and controlling means comprising a radial lifting arm swingable vertically about a center to raise and lower said table, a table-carrying rocker arm fulcrumed to and rising from said radial arm, counterbalancing means constantly acting on said arm to swing the same upwardly and to balance the load carried thereby, and a stop limiting the upward swing of said arm.

9. A work table having supporting and controlling means comprising a radial supporting arm swingable vertically about a fixed center to raise and lower said table, a table-carrying rocker arm fulcrumed to said radial arm, and a counterbalancing spring constantly tending to swing said arm upwardly and approximately balancing the load carried by said arm.

10. A work table having supporting and controlling means comprising a vertically swingable radial lifting arm provided with a hub supported and turnable on a fixed shaft and provided with a coiled counterbalancing spring constantly acting to rotate the hub to elevate the arm and the load carried thereby.

11. Work table supporting means comprising a stationary shaft, a hub mounted to turn on said shaft and provided with a lateral lifting arm for raising and lowering the table, a coiled spring on said hub and connected thereto to constantly tend to rotate said hub and elevate said arm and the load carried thereby, a stop limiting the upward swing of said arm, and clamping means carried by said hub for locking the same to said shaft with the arm at the desired elevation.

12. Work table supporting means comprising a stationary shaft, a hub turnable thereon and having a table raising and lowering arm, a clamp to secure the hub against turning on the shaft, and a coiled counterbalancing spring acting on the hub to rotate the same to elevate said arm and having adjustable connection with said hub.

13. In a grinding machine, in combination, a hub mounted to oscillate on a fixed axis and having a laterally projecting lifting arm, a coiled counterbalancing spring on said hub and at one end connected thereto to rotate the hub, means securing the opposite end of the spring independently of the hub, and a stop limiting rotation of the hub, said hub formed with a spring case.

14. In a grinding machine, in combination, a base, work table supporting means comprising a hub turnable on a fixed axis and provided with a radial table raising and lowering arm, a coiled counterbalancing spring arranged on said hub and at one end adjustably coupled thereto and at the other end fixed to the base, a pin to limit rotation of the hub beyond a certain point, and means whereby the hub can be locked to maintain the arm at any desired elevation.

15. In a grinding machine, in combination, a base having a stationary shaft, a hub mounted to turn on said shaft and provided with a lifting arm, work table upholding means carried by the lifting arm, a counterbalancing spring at one end coupled to the hub and at the other end confined to the base, said hub formed with a dust shield for said spring and consisting of an end disk like wall and an outer annular lateral flange.

16. In combination, in a grinding machine, a base, a shaft projecting therefrom, a hub turnable on the shaft, work table carrying means, said hub having crank lifting connection with said table carrying means, a coiled counterbalancing spring at its inner end coupled to said hub, a fixed pin to which the outer end of said spring is confined, and a stop pin carried by and rotating with said hub and adapted to engage said fixed pin to limit the rotation of the hub.

17. In combination, an arm swingable vertically on a fixed axis, a rocker arm supported by said swingable arm and pivotally mounted on the free end thereof on a horizontal axis, said rocker arm being counterweighted to normally maintain a vertical position extending upwardly from said swingable arm, a feed carriage adjustable horizontally on the upper end of said rocker arm, a work table mounted on said feed carriage, counterbalancing means acting on said swingable arm to balance the load carried thereby, means for locking the swingable arm against swinging movement, and means for locking said rocker arm against oscillation on said swingable arm.

18. In a grinding machine, in combination, a stud, means for supporting and adjusting the same vertically, a rocker arm at its lower end provided with a hub mounted to turn on said stud, a clamp carried by said hub for locking the same to and against oscillation on said stud, said rocker arm at its upper end having a horizontal extension, a table feed carriage mounted to slide horizontally on said extension, a work table mounted on said carriage, and table feeding devices between said arm and the carriage.

19. In combination, a horizontally disposed supporting stud, means for supporting the same, a hub mounted to turn on said stud, and a clamp for locking the hub against oscillation on the stud and comprising a pair of opposing clamp blocks arranged transversely of and housed and slidable in the hub and having beveled inner ends to respectively engage opposite side portions of the stud, and manually controlled means for drawing said blocks toward each other to grip the stud.

20. In combination, a stud, a hub mounted to oscillate on the stud, and a clamping device for locking the hub against oscillation on the stud and comprising a pair of opposing clamping blocks slidable in and transversely of the hub and having alined bores and beveled inner corners to engage the circumference of the stud, and a clamp applying and releasing bolt extending longitudinally through the bores of the blocks and provided with exterior actuating means.

21. In combination, a horizontally disposed stud, means for supporting the same, a work table carriage supporting rocker arm having a horizontally disposed hub mounted to rock on said stud, and a clamping device for locking the hub to and against oscillation on the stud, said clamping device being carried by the hub and arranged intermediate the length of the lower portion thereof and provided with exterior operating means and comprising means adapted to grip the lower portion of the circumference of the stud and draw the hub down tightly onto the top surface of the stud.

22. In combination, a horizontally disposed supporting stud, means for supporting the same, a rocker arm at its lower end having a hub mounted to turn on said stud, a support fixed to and depending from said hub, a counterweight carried by said support and adjustable longitudinally thereof, a feed carriage slidably mounted on the upper end of said arm, a work table mounted on said carriage, and feed works for adjusting the carriage horizontally on the upper end of said arm.

23. In combination, a supporting arm having a stud projecting horizontally from its upper end, a feed carriage slidably mounted on said stud and provided with a work table, said carriage having a longitudinal socket receiving and inclosing said stud and manually operated feed works between the arm and the portion of the carriage to one side of said stud and the socket receiving the same for feeding the carriage longitudinally of said stud.

24. In combination, an oscillating supporting arm adjustable about a horizontal axis, a feed carriage mounted on the upper end of said arm in horizontal sliding adjustment, said carriage forming a dust shield extending over the upper end of said arm, a work table mounted on said carriage, and manually operated feed works between the arm and the carriage for sliding the same horizontally on the upper end of said arm.

25. In combination, a supporting arm provided with a laterally projecting stud, a feed carriage adapted to have a work table mounted thereon and formed with a longitudinal socket intermediate its top and bottom to receive said stud in longitudinal sliding engagement, whereby the carriage incloses and is slidable longitudinally of said stud and is supported thereby, and depends below the same and manually controlled feed works between the arm and carriage for feeding the carriage on the stud.

26. In combination, an arm having a horizontally projecting cylindrical stud provided at its under side with a depending projection, a feed carriage adapted to receive a work table and having a longitudinal bore receiving said stud, said carriage resting on said stud in longitudinal sliding engagement and provided at the bottom of said bore with a longitudinal groove to receive said projection, and manually actuated feed works between said arm and said carriage for moving the carriage longitudinally of the stud.

27. In combination, an upwardly extending rocker arm, supporting means therefor, said arm at its upper end having a horizontally elongated projection, a horizontally elongated feed carriage mounted on said projection in longitudinal sliding adjustment, a work table mounted on the upper part of said carriage and arranged above the same, and manually actuated feed works comprising a portion extending transversely through said arm and longitudinally of and into moving engagement with said carriage.

28. In combination, an arm having a laterally extending stud, a work-table feed carriage mounted on and supported by said stud in longitudinal sliding adjustment and formed with a rearwardly extending shield extending over the end of said arm, whereby the stud is inclosed within the carriage, and manually actuated feed works between the arm and carriage.

29. In combination, an arm having a horizontal stud projecting therefrom, said arm formed with a bearing extending therethrough parallel with the stud, a work table feed carriage mounted on and supported by the stud in longitudinal sliding engagement, said carriage formed with a longitudinal threaded bore parallel with the stud and in alinement with said bearing, a longitudinally arranged screw in said bore and extending through said bearing, and manually controlled actuating means applied to the projecting end of said screw in rear of said arm and comprising graduated setting means for determining the feeding movement of the carriage.

30. In combination, a support, a work table feed carriage mounted thereon in sliding adjustment, a hand carriage-feed lever fulcrumed to said support, and adjustable actuating connections from said lever to the carriage comprising an adjustable graduated member whereby said connections can be set to determine the length of the carriage feed.

31. In combination, a support, a feed carriage in longitudinal sliding engagement therewith and provided with an actuating member projecting therefrom in the direction of the carriage feeding movement and provided with a stop, a fixed abutment opposing said stop, means whereby said stop can be adjusted to vary the feeding movement of the carriage, a hand lever fulcrumed independently of said carriage, and actuating connections between said hand lever and said actuating member.

32. In combination, a support, a feed carriage carried thereby in sliding engagement therewith and provided with a threaded bore parallel with the direction of feeding movement, said support having a bearing in alinement with said bore and a fixed abutment adjacent said bearing, a screw rod in longitudinal adjustment in said bore and slidably extending through said bearing and provided with a stop opposing said abutment, a graduated finger knob on said rod, a sleeve on said rod between said stop and knob and provided with an index, said rod being freely turnable in said sleeve, an actuating hand lever fulcrumed to said support, and an actuating link connection from said hand lever to said sleeve.

33. In a grinding machine, in combination, an elongated supporting stud having a reduced extremity forming an annular thrust bearing face, a hub mounted on said stud and inclosing said bearing face and formed with a contracted portion around said reduced end and provided with an annular internal bearing face opposite said thrust bearing face of the stud.

34. In combination, a bearing stud, work holder support and adjusting mechanism comprising a radial supporting arm having a hub mounted to oscillate on said stud and held thereon against longitudinal movement, the stud and hub formed with opposing annular end thrust bearing faces, the hub having an internal longitudinal oil distributing groove extending to said bearing faces, and means for supplying lubricant to said groove.

35. In combination, an oscillatory supporting arm having a laterally extending stud provided with a depending projection, a work table feed carriage slidably mounted on and supported by and inclosing said stud and formed with internal longitudinal groove receiving said projection, and provided with means for supplying lubricant to said groove.

36. In combination, a bearing stud, a work holder supporting and adjusting mechanism comprising an oscillatory arm having a hub mounted to oscillate thereon, the stud and hub formed with opposing annular end thrust bearing faces, limiting longitudinal movement of the hub on the stud in one direction, means on the stud stopping movement of the hub in the opposite direction, the hub having an internal annular enlargement around said bearing faces forming an oil groove, and means for supplying lubricant to said groove.

37. In a grinding machine, a work-table carrier having a raised portion at the side thereof provided with a work table-angle indicating scale, a work table mounted on said carrier to rock vertically and provided with a depending pointer finger at its free end movable along the edge of said raised portion and having an index adapted to be brought into coincidence with any one of the indications of said scale to indicate the angle of the table.

38. A work table carrier provided with a raised portion having a curved longitudinal edge and having angle indicating graduations, in combination with a tiltable work table provided with clamping means and having a depending pointer swingable therewith and at its free end movable along said edge of said segmental portion, the axis on which said table swings forming the center of curvature of said edge.

39. A support, in combination with a sliding reciprocatory feed carriage adapted to carry the work support, a hand lever carried by said support, and operative connections between said lever and said carriage whereby the carriage can be rapidly moved on its feed stroke by swinging the lever in one direction and can be rapidly moved on its return stroke by swinging said lever in the opposite direction.

40. A support, in combination with a work-support feed carriage, a hand lever removably fulcrumed on said support, and operative carriage reciprocating connections between said lever and said carriage, said connections being removably connected with said carriage.

41. In combination, in a grinding machine, a table carriage, a work table pivotally mounted on said carriage, means for fixing the table to the carriage at the desired angle with respect to the grinding surface, and a table-angle-indicating pointer swinging with the table with its free end beside the carriage, said carriage having a curved fixed side portion provided with a table-angle indicating scale along which said pointer moves as the table is rocked.

42. A grinding machine having a rocker arm rockable vertically in a plane parallel with the plane of the grinding surface, a work-table feed carriage mounted on the upper end of said arm and movable thereon transversely of said planes and toward and from the grinding surface, and a supporting fulcrum for said arm and on which the same is rockable, said fulcrum provided with means for varying the elevation thereof.

43. A grinding machine having a work-table-carrying rocker arm, and a supporting fulcrum for said arm provided with and carried by a radial arm adjustable about a center.

44. A grinding machine having a counter-balanced rocker arm, a rocker-arm-supporting fulcrum, provided with and carried by a radial arm adjustable about a center, and a work-table-feed carriage carried by the rocker arm and movable thereon toward and from the grinding surface.

45. A grinding machine having a work-table-carrying rocker arm counter-balanced to normally maintain the upright position, and a supporting fulcrum for said arm provided with supporting means radially adjustable vertically about a horizontal center.

46. In a grinding machine, in combination, a vertically rotatable plane grinding surface, a rocker arm counter-balanced to normally maintain its upright position, a work support carried by said arm opposite said surface, and a horizontal supporting fulcrum for said arm bodily adjustable in a vertical plane about a center to carry said work support to any point above or below or to either side of the axis of rotation of said disk.

47. In combination, in a grinding machine, a vertically rotatable grinding disk, a work support in front of said disk, and circularly adjustable supporting means for said support bodily carrying said support in a vertical plane about a center to a position opposite any portion of said disk above, below or to either side of the horizontal axis of rotation thereof.

48. A grinding machine having a work support in front of a vertically rotatory grinding surface, and adjustable supporting devices therefor bodily carrying said support in a vertical plane circularly about a center to any position above, below or to either side of the axis of rotation of the grinding surface and embodying means for maintaining the support in the desired adjustment.

49. A grinding machine having an upright, work-support-carrying rocker arm, a support therefor adjustable in a vertical plane circularly about a center to bodily carry said arm vertically to different elevations and laterally to different positions in the same vertical plane, and means for maintaining said arm in the desired adjustment.

50. A grinding machine having a vertical grinding surface rotatable about a horizontal axis, a work support in front of said surface provided with a carriage, means for supporting said carriage and on which the carriage is adjustable toward and from said surface, said means comprising a fulcrum adjustable in a vertical plane circularly about a center and bodily carrying said support about a center coincident with the horizontal axis of rotation of said surface, and mechanism for holding said support in the desired adjustment with respect to said disk.

51. A grinding machine having a work-support-carrying rocker arm, and a supporting fulcrum therefor provided with and carried by counterbalanced means circularly adjustable about a center.

52. A grinding machine having a work-support-carrying rocker arm, and a supporting fulcrum therefor provided with means holding the same spaced from and adjustable about a horizontal center.

53. A grinding machine having a vertically disposed work-support-carrying member, a radial supporting member therefor adjustable in a vertical plane about a center, and means for holding said members in the desired adjustment.

54. A grinding machine having a work-table-supporting rocker arm having a supporting fulcrum provided with a radial supporting arm adjustable in a curved path about a fixed center.

In testimony whereof I affix my signature, in presence of two witnesses.

CHARLES R. CARPENTER.

Witnesses:
S. M. HARBRIDGE,
D. E. HOWELL.